Patented Jan. 13, 1925.

1,522,698

UNITED STATES PATENT OFFICE.

CHARLES E. PARSONS, OF NEW YORK, N. Y., ASSIGNOR, BY MESNE ASSIGNMENTS, TO METAL RESEARCH CORPORATION, OF NEW YORK, N. Y., A CORPORATION OF DELAWARE.

PROCESS OF MAKING SODIUM ALUMINATE AND OTHER PRODUCTS.

No Drawing.   Application filed March 18, 1924.   Serial No. 700,165.

*To all whom it may concern:*

Be it known that I, CHARLES E. PARSONS, a citizen of the United States, residing at New York, in the city of New York and State of New York, have invented certain new and useful Improvements in Processes of Making Sodium Aluminate and Other Products; and I do hereby declare the following to be a full, clear, and exact description of the invention, such as will enable others skilled in the art to which it appertains to make and use the same.

This invention relates to a process of making sodium aluminate and other products from blast furnace slag, and has for its object to improve the procedures heretofore proposed.

With this and other objects in view, the invention consists in the novel steps and combinations of steps constituting the process, all as will be more fully hereinafter disclosed and particularly pointed out in the claims.

In order that the invention may be the more clearly understood, it is said:

It is well known that a typical blast furnace slag from a basic or steel making pig iron furnace burden has the following general composition:

|  | Per cent. |
|---|---|
| Silica | 35 |
| Lime | 43 |
| Magnesia | 6 |
| Alumina | 13 |
| Sulphur | 2 |
| Manganese | 1 |
|  | 100 |

It has been found when such slag is ground to approximately 100 mesh and digested with a solution of sodium hydroxide, a double decomposition occurs, producing insoluble calcium and magnesium silicates and a soluble sodium aluminate which may be separated out by filtration, and the sodium aluminate recovered by well known procedures in a state of exceptional purity. Some of the reactions may be stated thus:—

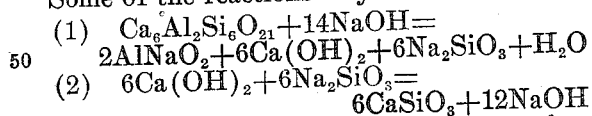

In carrying out the invention, it is preferable to make such digestion at high temperatures of from, say, 150° C. to 250° C., and in an autoclave; but the use of such high temperatures serves chiefly to increase the reaction velocity, and is not essential to this process.

After the removal of the sodium aluminate solution, the filter residuum is treated for the recovery of the calcium and magnesium silicates present. The mass of this residuum consists chiefly of such silicates in a light flocculent form, but there is also present more or less undigested slag, manganese silicates, etc. The flocculent and purified calcium and magnesium silicates are or may be separated by agitating the whole mass in water, and passing the resulting suspension through any suitable well known pulp thickener, but preferably through a centrifugal separator.

By this means, the heavier undigested slag is separated from the light flocculent alkaline earth silicates, and these latter are dewatered by any suitable means such as a filter press. The end products consist of silicates of calcium and magnesium free from iron, and are of great value in the arts as for example in making glass, for the alkaline earths being already in the form of silicates, the glass maker is not required to use in his melting pots the high temperature necessary to make alkaline earth silicates by direct fusion, as heretofore, and by this means, combined magnesium can be introduced into the glass melt at moderate temperatures, and thus enable the lowering of the expansion coefficient of the glass.

After these magnesium and calcium silicates are thus obtained, if they are to be employed in the making of glass, one proceeds to make up the regular glass charge by using said silicates of calcium and magnesium in the place of equivalent quantities of sand, lime, and magnesium carbonates, heretofore usually employed. Then to these said calcium and magnesium silicates is also added the usual quantities of the other constituents that usually make up the glass charge, such as sodium sulphate, sodium carbonate, and a sufficient quantity of silica to supply the deficiency of silica carried by said calcium and magnesium silicates.

The sodium aluminate, after having been recovered from its solution by well known procedures, may be sold as such, or used in any suitable and desired industry.

What is claimed is:—

1. The process of making sodium aluminate, calcium silicate and magnesium silicate from blast furnace slag containing combined aluminum, calcium and magnesium, which consists in finely dividing said slag; adding sodium hydroxide thereto, digesting the mixture thus produced at a superatmospheric pressure until the desired products are formed; separating out the soluble sodium aluminate from the insoluble silcates thus produced; and separating out from the residue the desired calcium and magnesium silicates.

2. The process of making sodium aluminate, calcium silicate and magnesium silicate from blast furnace slag containing combined aluminum, calcium and magnesium, which consists in finely dividing said slag; adding sodium hydroxide thereto in a sufficient quantity to react with all the combined aluminum, calcium and magnesium present; digesting the mixture thus produced at a superatmospheric pressure exceeding 150° until the desired products are formed; separating out by filtration the soluble sodium aluminate from the insoluble silicates thus produced; and separating out from the residue the desired calcium and magnesium silicates.

In testimony whereof I affix my signature.

CHARLES E. PARSONS.